United States Patent [19]

Larson et al.

[11] Patent Number: 4,558,720
[45] Date of Patent: Dec. 17, 1985

[54] CLOSED-CENTER CONTROLLER FOR USE WITH UNEQUAL AREA CYLINDER

[75] Inventors: Bernard J. Larson, New Hope; James K. Yip, Richfield, both of Minn.

[73] Assignee: Eaton Corporation, Cleveland, Ohio

[21] Appl. No.: 749,130

[22] Filed: Jun. 27, 1985

Related U.S. Application Data

[63] Continuation of Ser. No. 476,078, Mar. 17, 1983, abandoned.

[51] Int. Cl.$^4$ .............................................. B62D 5/08
[52] U.S. Cl. ................................ 137/625.24; 137/312; 137/596.13; 137/625.21; 91/375 A; 91/467; 60/384; 60/494; 418/61 B
[58] Field of Search ................. 60/384, 494; 418/61 B; 91/467, 375 R; 137/625.24, 96, 312, 596.13

[56] References Cited

U.S. PATENT DOCUMENTS

| | | | |
|---|---|---|---|
| 4,096,883 | 6/1978 | Yip | 137/596.13 |
| 4,159,723 | 7/1979 | Baatrup et al. | 137/596.13 |
| 4,167,893 | 9/1979 | Johnson | 137/596 R |
| 4,311,171 | 1/1982 | Roberts | 137/625.23 |

*Primary Examiner*—Martin P. Schwadron
*Assistant Examiner*—John S. Starsiak, Jr.
*Attorney, Agent, or Firm*—C. H. Grace; L. J. Kasper

[57] ABSTRACT

A closed-center, non load-sensing controller (15) is disclosed for use with an unequal area steering cylinder (17). The controller includes valving comprising a spool (35) and sleeve (37). The sleeve includes an annular groove (65) in communication with the inlet port (29) and cylinder ports (73,75) in communication with the opposite ends of the steering cylinder. The sleeve defines an annular leakage groove (95) which is disposed to interrupt the flow of leakage fluid from the annular groove (65) to the cylinder ports (73,75), to eliminate undesired piston rod extension. When the valving is in neutral, leakage fluid collected in the annular groove (95) is communicated through radial bore (97), axial slots (83), and annular groove (81), axial slots (91), drain bore (99), drain bore (93), and then to the system reservoir.

7 Claims, 6 Drawing Figures

CLOSED-CENTER CONTROLLER FOR USE WITH UNEQUAL AREA CYLINDER

CROSS-REFERENCE TO RELATED APPLICATION

This application is a continuation of U.S. application Ser. No. 476,078, filed Mar. 17, 1983, now abandoned.

BACKGROUND OF THE DISCLOSURE

The present invention relates to closed-center fluid controllers, and more particularly, to such controllers which are to be used with unequal area steering cylinders.

In many vehicle steering systems, closed-center controllers are now used rather than open-center controllers, primarily because a closed-center controller, fed by a variable displacement pump, does not consume as much engine horsepower as does an open-center controller, fed by a fixed displacement pump.

Typically, vehicle steering systems including closed-center controllers have used double rod end, equal area steering cylinders. In most such systems, it would be more desirable to utilize an unequal area cylinder, primarily because such cylinders are cheaper, and lend themselves to simpler and less expensive installation on the vehicle.

However, there are a number of vehicles, such as loader-backhoes, where it has not been considered possible to combine an unequal area cylinder and a closed center controller for various reasons. As one example, in a loader-backhoe, the steering wheels may be raised off the ground while certain vehicle implements are being used. It has been found that the buildup of residual pressure, due to leakage, in the steering system will cause extension of the piston rod of an unequal area cylinder, thus changing the orientaion of the steered wheels. If this occurs without the operator being aware of the change, an objectionable condition may exist when the steered wheels again engage the ground and the vehicle begins to move.

Accordingly, it is an object of the present invention to provide an improved closed-center controller which may be used with an unequal area steering cylinder without the buildup of residual pressure in the system and the resulting undesired piston rod extension.

The above and other objects of the present invention are accomplished by the provision of an improved closed-center controller of the type including a housing having a fluid inlet port, a fluid return port, and a pair of control fluid ports adapted for connection to an unequal area piston-cylinder fluid pressure device. A valve means disposed within the controller housing includes a primary rotatable valve member and a relatively rotatable follow-up valve member which define a neutral position and at least one operating position. One of the valve members and the housing cooperate to define an inlet fluid region in communication with the inlet ports, an at least one control fluid region in communication with one of the control fluid ports.

The controller is characterized by the follow-up valve member and the housing cooperating to define a generally annular leakage fluid chamber disposed axially between the inlet fluid region and the control fluid region to interrupt the flow of leakage fluid from the inlet fluid region to the control fluid region between the housing and the follow-up valve member. Neutral drain passage means is disposed to provide communication between the leakage fluid chamber and the fluid return port when the valve means is in the neutral position, and flow through the neutral drain passage means is blocked when the valve means is in the operating position.

DESCRIPTION OF THE PREFERRED EMBODIMENT

Figure 1:
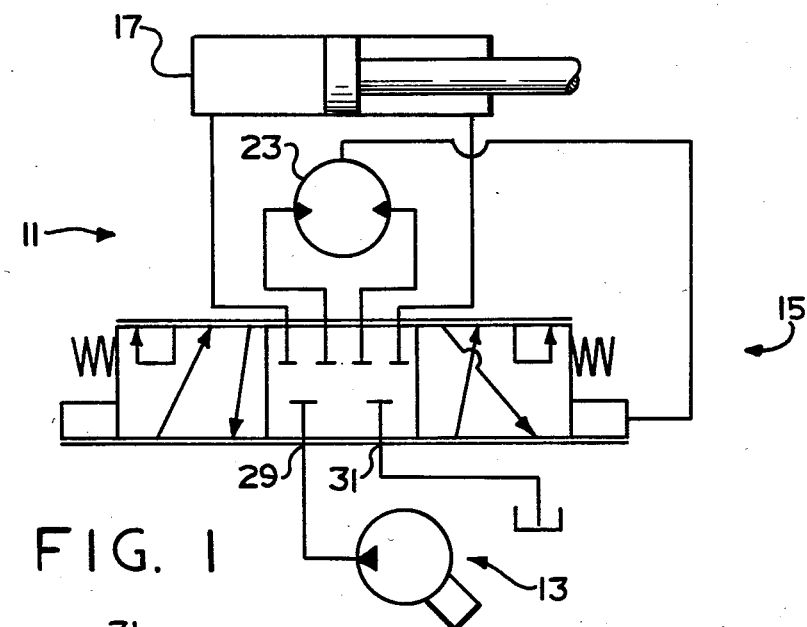
FIG. 1 is a schematic of a simple hydraulic circuit including an unequal area cylinder and a fluid controller made in accordance with the present invention.

Referring now to the drawings, which are not intended to limit the present invention, FIG. 1 illustrates schematically a simple hydraulic circuit of the type with which the present invention may be used. The circuit includes a hydrostatic power steering system, generally designated 11, which is supplied with pressurized fluid by a pressure compensated, variable displacement pump 13, the compensator portion of which is shown only in schematic form, as its operation is well known in the art and forms no part of the present invention.

Figure 2:
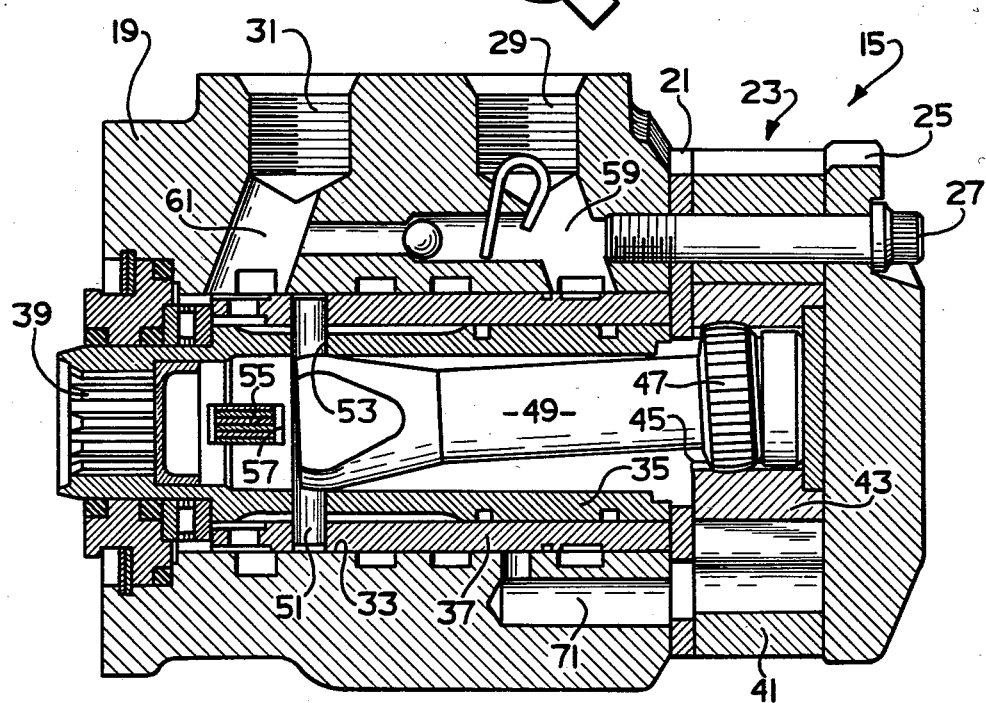
FIG. 2 is an axial cross section of the controller which is shown schematically in FIG. 1.

The output from the pump 13 is fed to a closed-center steering control valve, generally designated 15, which is shown in greater detail in FIG. 2. The steering control valve 15 (controller) directs the flow of pressurized fluid to either the right end or the left end of a power steering cylinder 17 in response to rotation of a vehicle steering wheel (not shown) in the appropriate direction. Certain details of the controller 15 shown schematically in FIG. 1 will be referenced in connection with the subsequent description of FIGS. 2-4.

The controller 15, which will be described only briefly herein, may be seen in greater detail, and its operation better understood, by reference to U.S. Pat. No. 3,801,239 which is assigned to the assignee of the present invention. The controller 15 is comprised of several sections, including a housing 19, a port plate 21, a fluid meter 23, and an end plate 25. These sections are held together in tight sealing engagement by means of a plurality of bolts 27 which are in threaded engagement with the housing 19.

The housing 19 defines a fluid inlet port 29, a fluid return port 31, and a pair of control fluid ports (not shown in FIG. 2) which, as shown in FIG. 1, are connected to the opposite ends of the cylinder 17.

Rotatably disposed within a valve bore 33 defined by the housing 19 is the valving shown schematically in FIG. 1, which comprises a primary, rotatable valve member (spool) 35 and a cooperating, relatively rotatable follow-up valve member (sleeve) 37. The forward end of the spool 35 includes a portion having a reduced diameter and defining a set of internal splines 39 which provide for a direct mechanical connection between the spool 35 and the steering wheel. The spool 35 and sleeve 37 will be described in greater detail subsequently.

The fluid meter 23, in the subject embodiment, comprises a gerotor gear set including an internally toothed stator 41 and an externally toothed rotor 43. The rotor 43 defines a set of internal splines 45, and in splined engagement therewith is a set of external splines 47, formed at the rearward end of a drive shaft 49. The shaft 49 has a bifurcated forward end permitting driving connection between the shaft 49 and the sleeve 37 by means of a pin 51 passing through a pair of circumferentially-elongated pin openings 53 in the spool 35. Thus, pressurized fluid flowing through the valving in response to the turning of the spool 35 flows to the fluid meter 23 causing orbital and rotational movement of the rotor 43 within the stator 41. Such movement of the rotor 43 causes follow-up movement of the sleeve 37 by means of the drive shaft 49 and pin 51, to maintain an appropriate relative displacement between the spool 35 and sleeve 37, for any particular rate of rotation of the steering wheel. A plurality of leaf springs 55, extending through springs openings 57 in the spool 35, urges the sleeve 37 toward the neutral position, relative to the spool 35. It may be seen in FIG. 2 that pressurized fluid is communicated from the fuid inlet port 29 to the sleeve 35 by means of a fluid passage 59, which return fluid is communicated from the sleeve 37 to the fluid return port 31 by means of a fluid passage 61.

Figure 3:
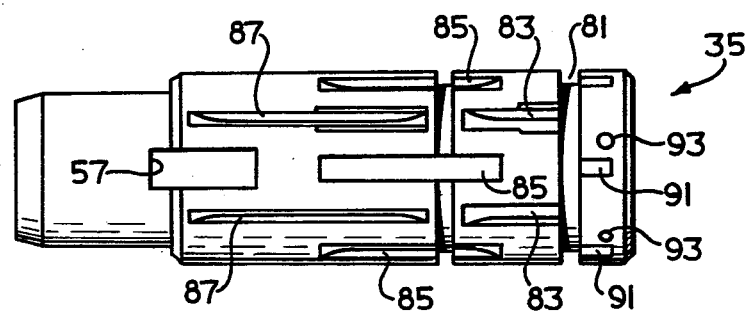
FIG. 3 is an elevation view of the primary valve member utilized in the controller of FIG. 2.
Figure 4:
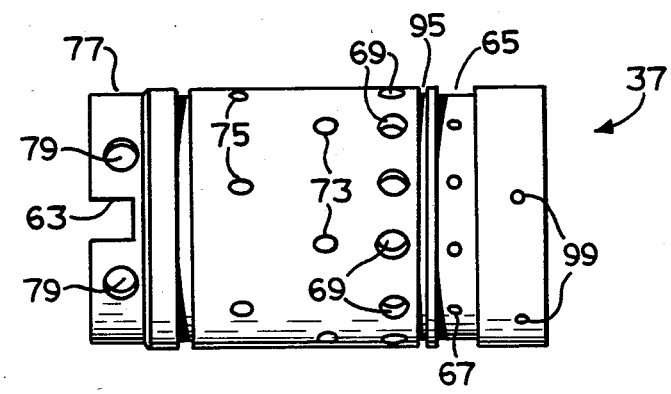
FIG. 4 is an elevation view of the follow-up valve member utilized in the fluid controller of FIG. 2.

Referring now to FIGS. 3 and 4, the spool 35 and sleeve 37 may be seen in greater detail. It should be noted that in FIGS. 3 and 4, the spool 35 and sleeve 37 are shown in their proper relative axial position, i.e., the right end surface of both lie in the same plane. In addition, the spool 35 and sleeve 37 are shown in their proper relative rotational position to define therebetween the neutral condition illustrated schematically in FIG. 1.

Referring now more specifically to FIG. 4, it may be seen that the sleeve 37 defines a pair of diametrically-opposed openings 63 through which the leaf springs 55 extend radially outwardly. The sleeve 37 defines an annular groove 65 disposed axially to be in continuous fluid communication with the passage 59 from the fluid inlet port 29. Disposed in fluid communication with the groove 65 is a plurality of ports 67 which, in the neutral position, have communication therethrough blocked by the outer surface of the spool 35. It is this blockage of fluid flow through the ports 67 in the neutral position of the spool and sleeve which makes the valving of the controller 15 closed-center. To the left of the annular groove 65 is a plurality of meter ports 69 which communicate between the valving and the expanding and contracting volume chambers of the fluid meter 23 by means of a plurality of axial bores 71 defined by the housing 19 (see FIG. 2). Disposed to the left of the meter ports in FIG. 4 is a plurality of cylinder ports 73 and a plurality of cylinder ports 75 disposed such that when the ports 73 communicate metered fluid to one end of the cylinder 17, the ports 75 receive return fluid from the opposite end of the cylinder 17. At its left end, the sleeve 37 includes a portion 77 having a slightly reduced diameter, such that an annular passage is defined between the valve bore 33 and the reduced portion 77. The portion 77 defines a plurality of openings 79, the function of which will be described subsequently.

Referring now to FIG. 3, the spool 35 defines an annular groove 81, and in communication therewith, a plurality of axial slots 83. When the spool 35 is displaced from the neutral position, relative to the sleeve 37, every other port 67 begins to communicate with the adjacent axial slot 83 to define therebetween a variable orifice, the composite of these individual variable orifices comprising the main flow control orifice of the controller 15. Each of the axial slots 83 also communicates with one of the meter ports 69, and metered fluid returning from the fluid meter 23 flows through alternate ones of the meter ports 69 and enters an adjacent axial slot 85. The axial slots 85 communicate with either the adjacent cylinder ports 73, or the adjacent cylinder ports 75, depending upon the direction of rotation of the steering wheel. In either case, fluid returning from the cylinder 17 through the other of the cylinder ports 73 or 75 then flows through the respective axial slot 87. The left end of each of the axial slots 87 communicates with one of the openings 79, such that this return fluid flows through the annular passage surrounding the portion 77, then through the fluid passage 61 to the fluid return port 31, from where it flows back to the system reservoir (see FIG. 1). Of the structure described up to this point, it should be noted that the interface of the housing 19 and sleeve 37 define, for purposes of the subsequent claims, a pair of regions; the region adjacent the annular groove 65 comprising "an inlet fluid region", and the region beginning with the meter ports 69 and extending to the left therefrom in FIGS. 3 through 6 comprising a "control fluid region".

Figure 6:
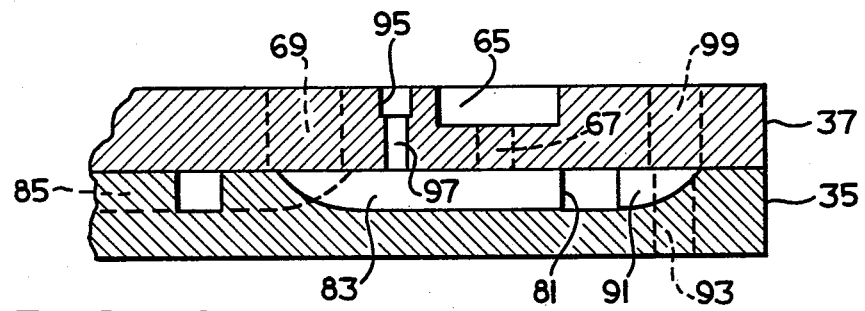
FIG. 6 is a fragmentary cross section taken on line 6—6 of FIG. 5, and on the same scale as FIG. 5.
Figure 5:
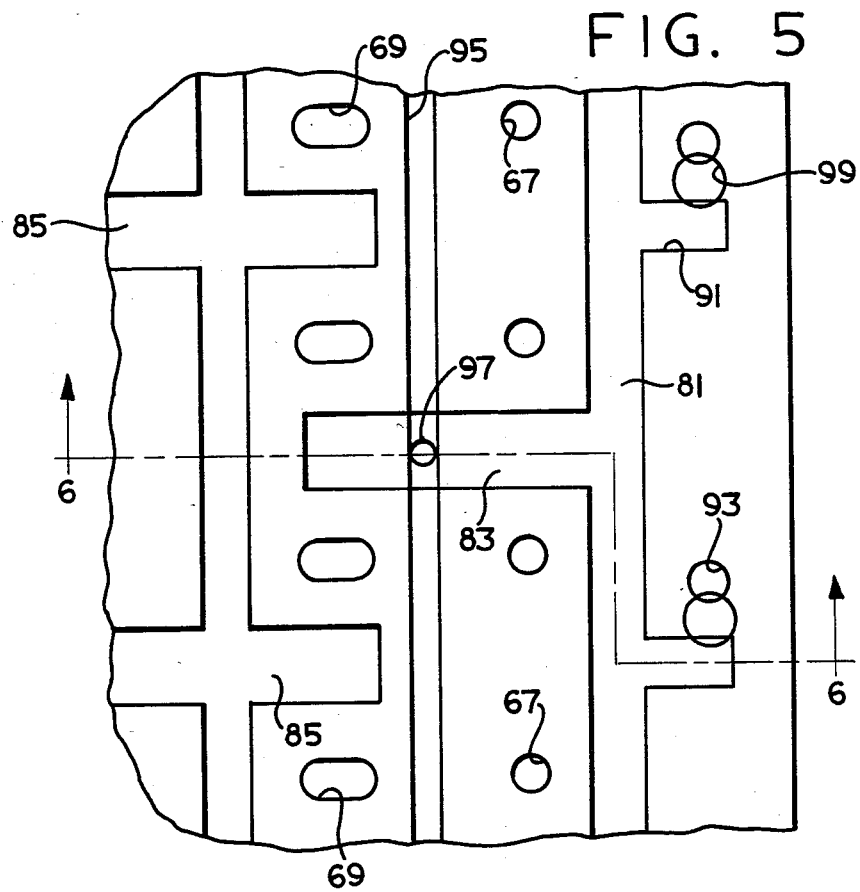
FIG. 5 is an enlarged, layout view showing the valving interface of the primary and follow-up valve members of FIGS. 3 and 4.

It should be noted that all of the structure described up to this point is well known on closed-center controllers of the type sold commercially by the assignee of the present invention. Referring now to FIGS. 5 and 6, in conjunction with FIGS. 3 and 4, the additional structure associated with the present invention will now be described. The spool 35 defines a plurality of axial slots 91 extending to the right from the annular groove 81. Each of the axial slots 91 is circumferentially-aligned with one of the axial slots 85. The spool 35 further defines a plurality of radial drain bores 93, each of which is disposed circumferentially adjacent one of the axial slots 91.

The sleeve 37 defines an annular leakage groove 95, disposed axially between the annular groove 65 and the meter ports 69. Although FIG. 5 has been described as illustrating only the interface of the spool and sleeve, the leakage groove 95, which is disposed on the outer periphery of the sleeve 37, is included in FIG. 5 for purposes of illustration. As shown only in FIGS. 5 and 6, the sleeve 37 defines a radial bore 97 disposed to be in fluid communication with the leakage groove 95. The sleeve 37 also defines a plurality of radial drain bores 99.

Each of the radial bores 97 is circumferentially disposed such that, when the spool 35 and sleeve 37 are in the relative neutral position, the bore 97 is centered relative to the axial slot 83, as shown in FIG. 5, and in communication therewith. In addition, the drain bores 99 are disposed axially and circumferentially such that, when the valving is in the neutral position, each of the bores 99 is centered relative to the adjacent axial slot 91 and the adjacent drain bore 93, as shown in FIG. 5, thus permitting fluid communication from the slot 91 into the drain bore 99, then into the drain bore 93. As is well known in the art, the drain bore 93 communicates with the interior of the spool 35 which is in continuous fluid communication through spring openings 57 and the fluid passage 61 with the return port 31 and the system reservoir.

In a closed-center controller of the general type described above, but not including the present invention, it is fairly common for a fluid pressure in the range of about 2500 psi to be present in the annular groove 65 of the sleeve 37 when the controller is in the neutral condition. With such a substantial fluid pressure present in the groove 65, fluid leakage occurs between the outer surface of the sleeve 37 and the valve bore 33. Such leakage fluid would flow primarily to the left in FIGS. 2–6, toward the cylinder ports 73 and 75. After a brief period of time, the flow of leakage fluid builds up a residual pressure in the passages and conduits between the cylinder ports 73 and 75 and the respective ends of the steering cylinder 17. If an equal area cylinder were being used, the residual pressure in the lines would create no problem. However, with an unequal area cylinder as shown in FIG. 1, the residual pressure communicating between the cylinder ports 75 and the left end of the steering cylinder 17 acts over a larger area of the piston than does the residual pressure between the cylinder ports 73 and the right end of the cylinder 17. As a result, the piston and rod of the cylinder 17 will extend to the right in FIG. 1. It has been determined that this residual pressure is typically in the range of about 1500 psi when the inlet pressure in the annular groove 65 is in the range of about 2500 psi. Although a pressure of this magnitude may not be sufficient to turn the steered wheels when the wheels are on the ground, subjected to the normal vehicle weight, this residual pressure is more than sufficient to cause turning of the steered wheels when the wheels are not supporting the normal weight of the vehicle, or are even lifted out of contact with the ground.

With the present invention included in the controller 15, leakage fluid which flows from the groove 65, between the outer surface of the sleeve 37 and the valve bore 33, will enter the annular leakage groove 95. Leakage fluid which collects in the annular groove 95 will flow through the radial bore 97 into the axial slot 83, and from there, will flow into the annular groove 81 and into the axial slots 91. With the spool and sleeve in the neutral position shown in FIG. 5, the leakage fluid in the axial slots 91 will flow into the drain bore 99 in the sleeve 37, and then down through the drain bore 93 in the spool 35, then to the interior of the spool 35 and back to the system reservoir as previously described.

Because the leakage flow path of the present invention, as described, provides less resistance to fluid flow than does the clearance between the sleeve 37 and valve bore 33, the majority of the leakage fluid will flow through the leakage path of the invention, with only a very small portion of the leakage fluid flowing toward the cylinder ports 73 and 75. In the subject embodiment, the bore 97 and the drain bores 93 and 99 have been sized such that the residual pressure in the lines communicating with the cylinder 17 is in the range of about 50 psi, which is normally not enough to move the piston of the cylinder 17 and the steered wheels.

It will be understood by those skilled in the art that the present invention provides an improved closed-center controller whereby it is now acceptable to use a simpler and cheaper unequal area steering cylinder with a closed-center controller in a number of vehicles where the combination of a closed center controller and unequal area steering cylinder was not formerly acceptable.

It is believed that various alterations and modifications of the present invention will become apparent to those skilled in the art from a reading and understanding of the present specification. It is intended that all such alterations and modifications are included in the present invention, insofar as they come within the scope of the appended claims.

We claim:

1. In a closed-center, non load-sensing controller for use with an unequal area piston-cylinder fluid pressure device, the controller being of the type including a housing having a fluid inlet port, a fluid return port, and a pair of control fluid ports adapted for connection to the fluid pressure device; valve means disposed within said housing including a primary rotatable valve member and a relatively rotatable follow-up valve member defining a neutral position and at least one operating position, a fluid meter associated with said housing and including a movable member operable to measure the volume of fluid passing through said fluid meter, said follow-up valve member and said housing cooperating to define a plurality of meter passages operable to communicate fluid between said valve means and said fluid meter when said valve means is in said operating position, said follow-up valve member and said housing cooperating to define a plurality of control passages operable to communicate fluid between said valve means and said control fluid ports, said meter passages and said control passages defining a control fluid region, said follow-up valve member and said housing cooperating to define an inlet fluid region in fluid communication with said fluid inlet port, characterized by:
    (a) said follow-up valve member and said housing cooperating to define a generally annular leakage fluid chamber disposed axially between said inlet fluid region and said control fluid region to interrupt the flow of leakage fluid from said inlet fluid region to said control fluid region between said housing and said follow-up valve member; and
    (b) neutral drain passage means disposed to provide fluid communication between said leakage fluid chamber and said fluid return port when said valve means is in said neutral position, flow through said neutral drain passage means being blocked when said valve means is in said operating position.

2. A controller as claimed in claim 1 characterized by said fluid return port being adapted to be in fluid communication with a source of fluid at relatively low fluid pressure.

3. A controller as claimed in claim 1 characterized by said inlet fluid region comprising at least one of said follow-up valve member and said housing defining an annular groove in relatively unrestricted fluid communication with said fluid inlet port.

4. A controller as claimed in claim 3 characterized by said control fluid region comprising at least one of said follow-up valve member and said housing defining an annular groove in relatively unrestricted fluid communication with said one of said control fluid ports.

5. A controller as claimed in claim 1 characterized by said primary valve member defining an annular groove and a first plurality of axial slots in open fluid communication with said annular groove, said follow-up valve member defining a plurality of pressure ports in communication with said inlet fluid region, each of said pressure ports being in communication with the adjacent one of said axial slots when said valve members are in said operating position, and each of said pressure ports being blocked from communication with the adjacent one of said axial slots when said valve members are in said neutral position.

6. A controller as claimed in claim 5 characterized by said follow-up valve member defining at least one fluid passage in continuous fluid communication with said annular leakage fluid chamber, said fluid passage being in communication with one of said axial slots defined by said primary valve member when said valve members are in said neutral position, said fluid passage being blocked from communication with said one axial slot when said valve members are in said operating position, said fluid passage, said one axial slot and said annular groove defined by said primary valve member comprising a portion of said neutral drain passage means.

7. A controller as claimed in claim 6 characterized by said primary valve member defining a second plurality of axial slots in open communication with said annular groove, and extending therefrom in direction opposite that of said first plurality of axial slots, said primary valve member further defining a drain bore disposed adjacent one of said second axial slots, said follow-up valve member defining a drain bore disposed to be in communication with said one of said second axial slots and said primary valve member drain bore when said valve members are in said neutral position, said one of said second axial slots and said drain bores comprising a portion of said neutral drain passage means.

* * * * *